United States Patent
Whinnett et al.

[19]

[11] Patent Number: 5,983,092
[45] Date of Patent: Nov. 9, 1999

[54] METHOD AND APPARATUS FOR SYSTEM SELECTION

[75] Inventors: Nicholas Whinnett, Paris; William Robinson, Saint Nom la Breteche, both of France; Jonathan Gibbs, Southampton, United Kingdom; Anthony Van Den Heuvel, Clairefontaine, France

[73] Assignee: Motorola, Inc., Schaumburg, Ill.

[21] Appl. No.: 08/855,376

[22] Filed: May 13, 1997

[30] Foreign Application Priority Data

May 17, 1996 [GB] United Kingdom ............ 9610328

[51] Int. Cl.$^6$ .................................................. H04M 15/00
[52] U.S. Cl. ........................ 455/406; 455/408; 455/445
[58] Field of Search ................................. 455/406, 407, 455/432, 433, 435, 444, 414, 445, 408; 379/59, 114

[56] References Cited

U.S. PATENT DOCUMENTS

| | | | |
|---|---|---|---|
| 4,217,586 | 8/1980 | McGuffin ........................... 343/100 LE |
| 4,752,969 | 6/1988 | Rilling ..................................... 455/278 |
| 5,093,842 | 3/1992 | Gimlin et al. ........................... 375/10 |
| 5,218,359 | 6/1993 | Minamisono ........................ 342/383 |
| 5,274,844 | 12/1993 | Harrison et al. ................. 455/33.3 |
| 5,307,400 | 4/1994 | Sawyer et al. ...................... 455/445 |
| 5,420,914 | 5/1995 | Blumhardt ........................... 379/114 |
| 5,473,630 | 12/1995 | Penzias et al. ..................... 375/114 |
| 5,526,400 | 6/1996 | Nguyen ................................ 455/432 |
| 5,613,213 | 3/1997 | Naddell et al. ..................... 455/414 |
| 5,630,208 | 5/1997 | Enge et al. ............................... 455/65 |
| 5,634,199 | 5/1997 | Gerlach et al. ........................ 455/63 |
| 5,659,601 | 8/1997 | Cheslog ................................. 455/406 |
| 5,684,861 | 11/1997 | Lewis et al. ........................... 379/59 |
| 5,745,858 | 4/1998 | Sato et al. ............................ 455/562 |
| 5,752,168 | 5/1998 | Monot et al. ....................... 455/67.3 |
| 5,764,741 | 6/1998 | Barak ..................................... 379/114 |
| 5,767,806 | 6/1998 | Watanabe et al. ................. 342/373 |
| 5,799,071 | 8/1998 | Azar et al. ........................... 379/113 |
| 5,809,020 | 9/1998 | Bruckert et al. .................... 370/335 |
| 5,812,542 | 9/1998 | Bruckert et al. .................... 370/335 |

FOREIGN PATENT DOCUMENTS

| | | |
|---|---|---|
| 62-002755 | 1/1987 | Japan . |
| 8079307 | 3/1996 | Japan . |
| 2294844 | 5/1996 | United Kingdom . |
| WO9428683 | 12/1994 | WIPO . |

*Primary Examiner*—Edward F. Urban
*Assistant Examiner*—Thuan T. Nguyen
*Attorney, Agent, or Firm*—Heather L. Creps

[57] ABSTRACT

A method and apparatus enables selection a communication system when a user of a mobile unit is away from a home system to which it is registered. According to one novel aspect, the visited communication system broadcasts (402) a list of standardized type services including tariff information, which is used by the mobile unit to select a system. According to another novel aspect, the mobile initiates an outgoing call of a non-standardised type service by accessing (502) a candidate system and informing it of the location of the home network and desired service identifier. The candidate system obtains (504) the service information on this service from the home network, and then provides (546) a quotation for a required service. Also, a communication system according to the present invention minimises incoming call costs to the user wherein the home system polls (606) the communication systems within range of the mobile unit to select the best system to provide service.

4 Claims, 3 Drawing Sheets

METHOD AND APPARATUS FOR SYSTEM SELECTION

FIELD OF THE INVENTION

The present invention relates to communication systems, and more particularly, to a method and apparatus for selecting a communication system.

BACKGROUND OF THE INVENTION

Where a number of wireless networks which offer similar service capabilities are available for public access in the same geographic area, it is desirable to promote efficient spectrum loading, minimal call costs to the user, and competition between network operators. This is true in the user's "home" area as well as when the user roams to other areas. Efficient spectrum utilisation is promoted because lightly loaded systems can attract customers towards it. Also, overloading of networks, particularly packet data networks, can be avoided. By selecting the operator providing the desired service and quality of service at the lowest cost, the call costs tend to be minimised for the user, at least for outgoing calls. Finally, having dynamic costing structures promotes competition.

For future communications systems it is anticipated that two classes of service may exist. The first is a limited set of standardised core services such as telephony. The second is a set of operator-specific services which may be created by an operator and which are quite specific to the operator's network. A user in a home network may normally subscribe to a preferred operator or set of operators which provide mobility management and which together provide the user's desired service mix. An emerging requirement of third generation systems is that users when roaming should be able to access the same service set, even if the visited systems do not normally provide all the services.

Accordingly, there is also a need for a method and apparatus for selecting a communication system to minimize tariff rates.

DETAILED DESCRIPTION OF THE INVENTION

The present invention is directed to a method and apparatus for selection a communication system when a user of a mobile unit is away from the home system to which it is registered. According to one aspect of the present invention, the visited communication system broadcasts a list of standardized type services including any associated information such as quality, and tariff information for these services. At call setup time, the mobile scans all available systems and chooses one based upon the broadcasted information. According to an alternate embodiment, the mobile initiates an outgoing call of a non-standardised type service. In this case, the mobile accesses a candidate system and informs it of the location of the home network and desired service identifier. The candidate system obtains the service information on this service from the home network, and then provides a quotation for a required service. Also, a method of minimising incoming call costs to the user is described wherein the home system polls the communication systems within range of the mobile unit to select the best system to provide service.

Figure 1:
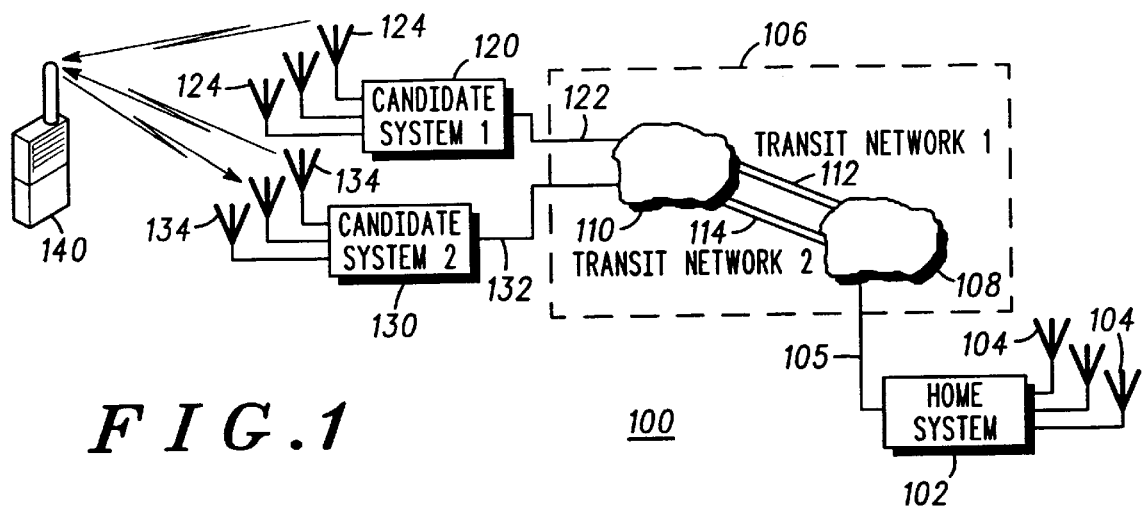
FIG. 1 is a block diagram of a communication network according to the present invention.

Referring to FIG. 1, a home system 102 having a plurality of base stations 104 is coupled to a communication network 106 via a fixed wire link 105. The communication network 106 is a wide area communication network including a wireline network. Generally, communication network 106 includes hubs 108 and 110 having various transmission paths, including transmit network path 112 and transmit network path 114. A candidate system 120 having a plurality of base stations 124 is coupled to the communication network 106 via the hub 110. A second candidate system 130 also having a plurality of base stations 134 is coupled to the hub 110 of the communication network 106. A mobile terminal 140 is adapted to communicate with the candidate systems 120, 130.

Figure 2:
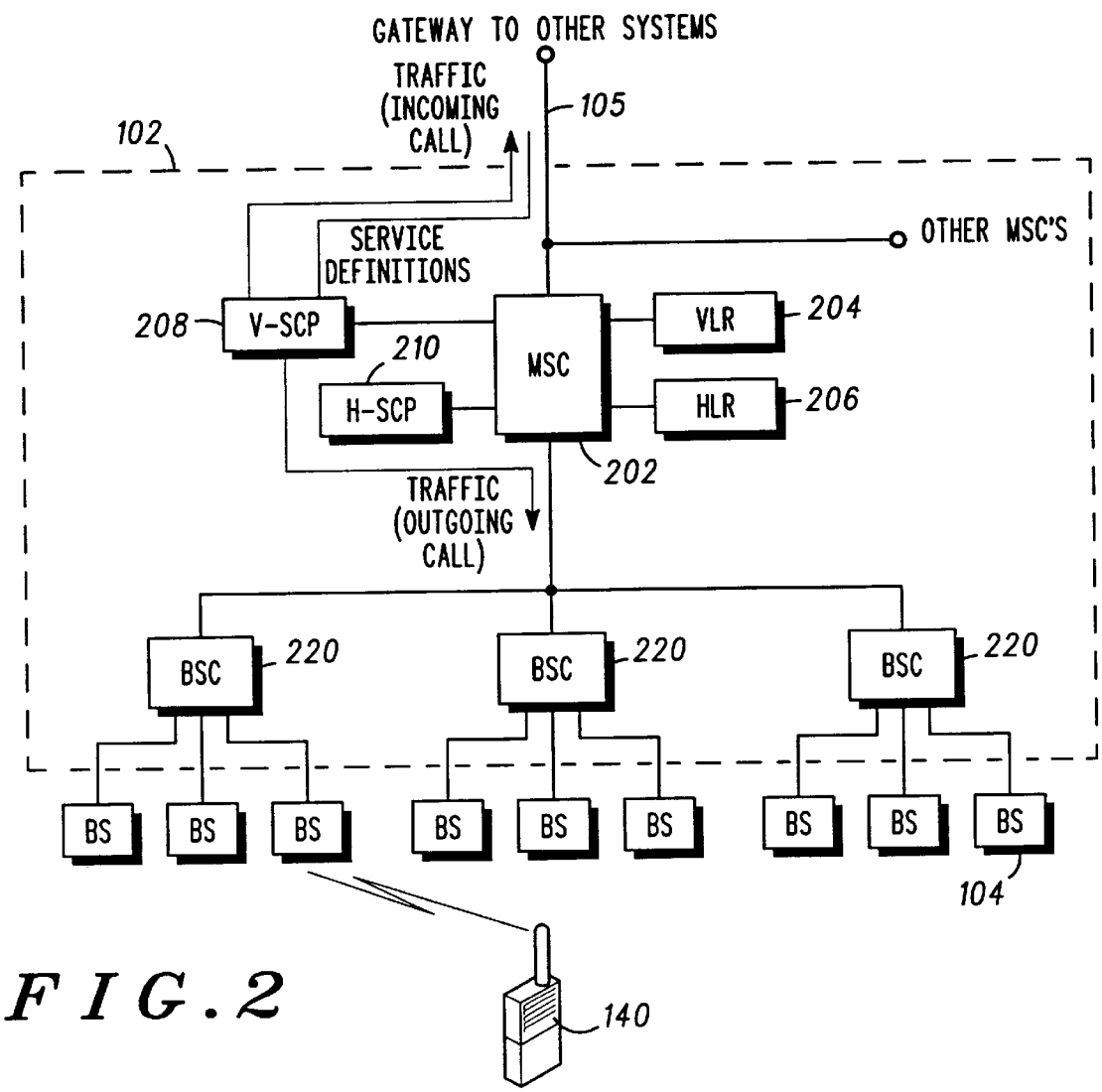
FIG. 2 is a block diagram of a communication system of FIG. 1.

Turning now to FIG. 2, the home system 102 preferably includes a mobile switching centre (MSC) 202. The MSC 202 is coupled to a Visitor Location Register (VLR) 204 as well as a Home Location Register (HLR) 206. The MSC 202 is also coupled to a Visitor Service Creation Platform (V-SCP) 208 as well as a Home Service Creation Platform (H-SCP) 210. The V-SCP 208 receives a service definition from a second system from which the mobile terminal 140 is visiting, and transmits tariff information to the second system for an incoming call. The V-SCP 208 also transmits tariff information for an outgoing call to a plurality of base station controllers (BSC) 220. The V-SCP 208 also controls the MSC using the service definition. Each BSC 220 is coupled to a plurality of base stations 104 which is adapted to communicate with the mobile terminal 140. Although the diagram shows by way of example the home system, the diagram could apply equally to one of the candidate systems 120, 130.

Figure 3:
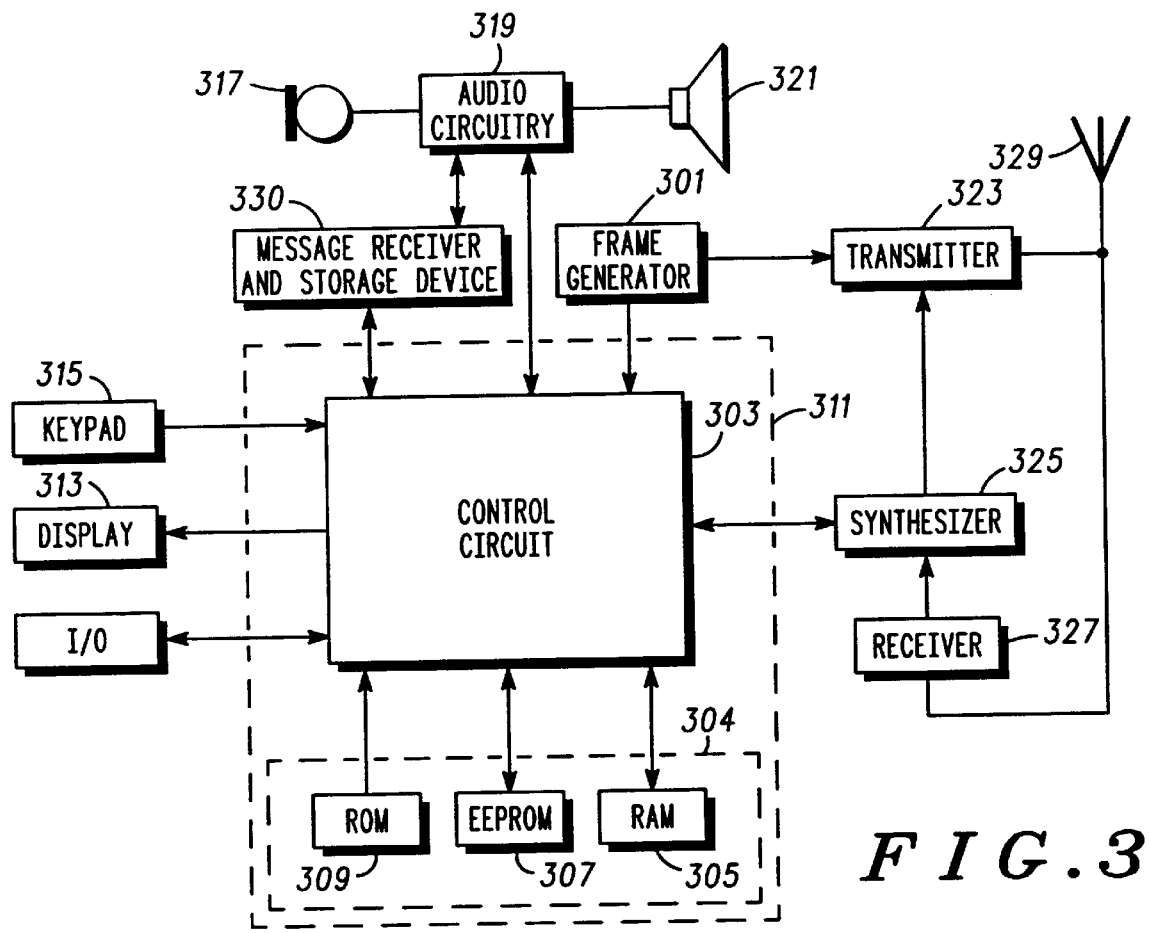
FIG. 3 is a block diagram of a transmitter adapted to operate according to the present invention with one or more systems of FIG. 1.

The mobile terminal 140 (FIG. 3), such as a cellular radiotelephone or other wireless communication device, comprises an ASIC (Application Specific Integrated Circuit) 301, such as a CMOS ASIC available from Motorola, Inc., and a microprocessor 303, such as a 68HC11 microprocessor also available from Motorola, Inc., which combine to generate a necessary communication protocol for operating in the communication system. The microprocessor 303 uses RAM 305, EEPROM 307, and ROM 309, consolidated in one package 304, to execute the steps necessary to generate the protocol and to perform other functions for the mobile terminal 40, such as writing to a display 313, accepting information from a keypad 315, and controlling a frequency synthesizer 325. The ASIC 301 processes audio transformed by the audio circuitry 319 from a microphone 317 and to a speaker 321. Transmitter 323 transmits through an antenna 329 using carrier frequencies produced by the frequency synthesizer 325. Information received by the antenna 329 of the mobile terminal 140 enters the receiver 327 which demodulates the symbols comprising the message frame using the carrier frequencies from the frequency synthesizer 325. The mobile terminal 140 may optionally include a message receiver and storage device including digital signal processing means. The message receiver and storage device could be, for example, a digital answering machine or a paging receiver. While the circuitry of FIG. 2 shows an exemplary terminal, other circuitry could be employed within the scope of the present invention.

Figure 4:
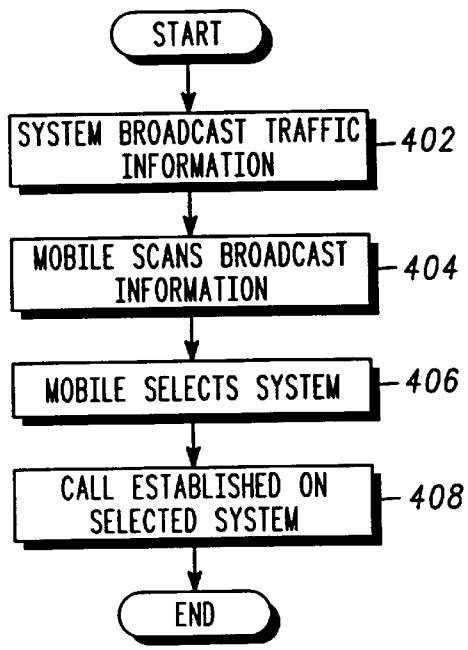
FIG. 4 is a flow chart showing the method of selecting a system to make an outgoing call according to the present invention.

Referring to FIG. 4, in order to make an outgoing call of a standardised type service, the candidate visited system broadcasts a list of standardized type services including any associated information such as quality and tariff information for these services (step 402). The tariff information may be a function of destination (e.g. long distance tariff). The tariff information is updated from time to time by the operator based, for example, upon system loading, and may include an indication of the duration for which the current tariff is valid. At call setup time, the mobile terminal 140 scans all available systems (step 404) and chooses one which offers the required service at the lowest rate (step 406). Alternatively, the mobile terminal 140 could select a system based upon criteria other than the cost of service. The mobile terminal 140 registers with the selected system for the required service and establishes the call (step 408). Alternatively, the mobile terminal 140 may also perform a background task of scanning the system broadcasts between calls and building up a tariff map of preferred systems for each service to reduce call setup delays.

According to an alternative embodiment, instead of the candidate systems 120, 130 broadcasting tariff information (step 402), the mobile terminal 140 polls local candidate systems 120, 130 at call set up time by initially on outgoing call of non-standard type service and informing the candidate system 120, 130 of the required service (the desired service identifier), and any additional information such as quality and destination, for example, the location of the home network 102. The polled candidate systems 120, 130 also respond with tariff information which is received by the mobile terminal 140 (step 404). The mobile terminal 140 then chooses the candidate system 120, 130 which offers the required service at the lowest rate (step 406), and registers with the candidate system 120, 130 which fulfils the above criteria for the required service, and subsequently places the call (step 408). The polling takes the form of individual accesses to the various candidate systems 120, 130. According to another alternative embodiment, the mobile terminal 140 "broadcasts" its requirements on a common access channel, and local candidate systems 120, 130 respond with tariff information using a multiple access scheme. This multiple access scheme may simply involve holding the tariff information on a downlink channel long enough that the mobile terminal 140 can read the offers of the candidate systems 120, 130.

Figure 5:
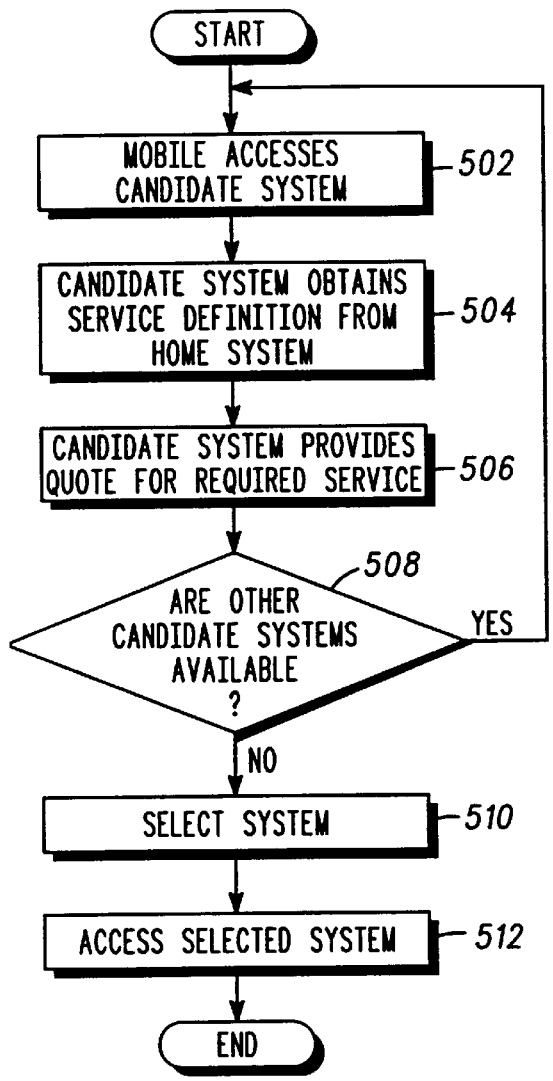
FIG. 5 is a flow chart showing the method for making an outgoing call for non-standardised service types according to the present invention.

Turning now to FIG. 5, broadcasts from the candidate systems 120, 130 are not possible because the service set is unlimited. In addition, the entire service definition may not be known to the mobile terminal 140 and therefore the potential candidate systems 120, 130 may have to interrogate the home service provider before they can quote a delivery charge.

Therefore, in order to initiate an outgoing call of a non-standardised type service, the mobile terminal 140 accesses one of the candidate systems 120, 130 and informs it of the location of the home network 102 and desired service identifier (step 502). The candidate system 120, 130 obtains the service information on this service from the H-SCP of the home network 102 (step 504), and then the V-SCP of the candidate system 120, 130 provides a quotation for a required service (step 506). The mobile terminal 140 then determines whether other candidate systems 120, 130 are available (step 508). If other candidate systems 120, 130 are available, the mobile terminal 140 accesses the candidate system 120, 130 (step 502). If no other candidate systems are available, the mobile terminal 140 selects the candidate system 120, 130 (step 510). The mobile terminal 140 then accesses the selected candidate system (step 512). Alternatively, the selection may be made by the home system.

In an alternate embodiment, the mobile terminal 140 accesses one of the candidate systems 120, 130 and provides it with a service definition for the desired service. The V-SCP of the candidate system 120, 130 then offers the mobile terminal 140 a rate. This is repeated for other candidate systems 120, 130. The mobile terminal 140 chooses the one which offers the required service at the lowest rate. In some cases, the candidate system 120, 130 may not be able to provide the desired service (for example, it may not have interconnection to a particular information database). In this case, a "no bid" indication may be given. For outgoing calls, the choice of transit network (i.e. long haul network between candidate system 120, 130 and home system 102) will be made by the candidate system 120, 130, and the particular destination or region may impact the offered rate to the user. Therefore, destination information for the call will be necessary.

Figure 6:
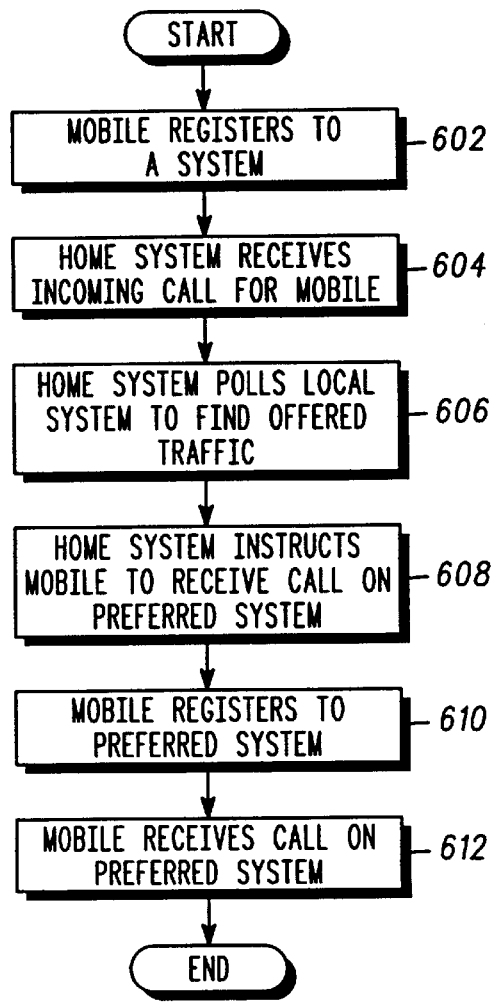
FIG. 6 is a flow chart showing the method for receiving an incoming call according to the present invention.

Turning now to FIG. 6, a method of receiving an incoming call whilst minimising incoming call costs to the user will now be described. This is useful where charges are levied on incoming calls when roaming, which is the case currently when roaming with GSM. The mobile terminal 140 registers to one of the candidate systems 120, 130 (step 602). The H-SCP of the home network 102 (or equivalent) receives an indication of the incoming call for the mobile terminal 140 (step 604), and poles candidate systems 120, 130 known to exist in the locality of the mobile terminal 140, including the current visited candidate system 120, 130 (step 606). This may require the HLR (or equivalent) to provide to the visited candidate system(s) 120, 130 information on the service definition, if the service is not of the standardised service type. Alternatively, the HLR may have stored previously arranged tariffs for different visited candidate systems 120, 130 and for different services.

If, within some time constraint, the HCR finds a system prepared to offer the service at a lower rate than the currently registered visited candidate system 120, 130, a short message is sent to the mobile terminal 140 via the currently registered candidate system 120, 130 which informs the mobile terminal 140 to try and find the system prepared to offer the service at the lower rate (step 608). The mobile terminal 140 may be informed of the control channel set of the candidate system(s) 120, 130. If the mobile terminal 140 is able to find the candidate system 120, 130 within a time constraint, then registration occurs (step 610) and the call is delivered via the new visited system (step 612). If no better rate is available on another visited candidate system 120, 130, the call is delivered on the original visited candidate system 120, 130. The choice made by the home system 102 will preferably include considerations of the costs of possible transit networks between home and visited systems.

According to the above embodiments, it is thus possible, provided that the services are available from the candidate systems, for a user of the mobile terminal to select and access a service not identical to or substantially identical to a service set provided by the home network of the user.

According to an alternate embodiment, the mobile initiates an outgoing call of a non-standardised type service by accessing a candidate system and informing it of the location of the home network and desired service identifier. The candidate system obtains the service information on this service from the home network, and then provides a quotation for a required service. While the specific implementations of the present invention are described above, variations and modifications could be made by one skilled in the art within the spirit and scope of the present invention. The present invention should be limited only by the appended claims.

We claim:

1. A method of transferring an incoming call made to a mobile unit associated with a home communication system to said mobile unit located in a visited communication system, said method comprising the steps off:

at the home communication system, receiving an incoming call to said mobile unit;

polling a plurality of communication systems accessible to said mobile unit and providing a service description to determine offered tariffs;

selecting one of said plurality of communication systems according to said offered tariffs; and instructing said mobile unit to receive said incoming call on said one selected communication system.

2. A method of transferring an incoming call made to a mobile unit comprising repeating the method steps of claim 1 on a call-by-call basis.

3. A home communication system adapted to transfer an incoming call made to a mobile unit associated with said home communication system to said mobile unit located in a visited communication system, said home communication system comprising:

means for receiving an incoming call to said mobile unit;

means for obtaining tariff information from other communication systems accessible to said mobile station;

means for selecting one of said other communication systems accessible to said mobile station depending on said tariff information; and means for providing instructions to said mobile unit to access said one selected communication system.

4. A communications system according to claim 3, wherein receiving the request for the call, obtaining tariff information and accessing of a selected communication system are provided on a call-by-call basis.

* * * * *